(12) United States Patent
Tester et al.

(10) Patent No.: US 7,561,101 B1
(45) Date of Patent: Jul. 14, 2009

(54) LAST KNOWN POSITION REPORTING FOR ALWAYS-ON GLOBAL POSITIONING SYSTEM RECEIVER

(75) Inventors: David P. Tester, Swindon (GB); Stephen P. Graham, Henley-on-Thames (GB)

(73) Assignee: Air Semiconductor, Ltd., Wiltshire (GB)

( * ) Notice: Subject to any disclaimer, the term of this patent is extended or adjusted under 35 U.S.C. 154(b) by 66 days.

(21) Appl. No.: 11/837,675

(22) Filed: Aug. 13, 2007

(51) Int. Cl.
*G01S 1/02* (2006.01)
(52) U.S. Cl. .............................. 342/357.06; 342/357.02; 342/357.15
(58) Field of Classification Search ............ 342/357.02, 342/357.06, 357.08, 357.12, 357.15; 701/213, 701/215
See application file for complete search history.

(56) References Cited

U.S. PATENT DOCUMENTS 6,683,564 B1 * 1/2004 McBurney ............. 342/357.02

2006/0152409 A1 * 7/2006 Raman et al. .......... 342/357.15
2007/0057841 A1 * 3/2007 McBurney et al. ..... 342/357.15

* cited by examiner

*Primary Examiner*—Dao L Phan
(74) *Attorney, Agent, or Firm*—Christopher P. Maiorana, PC (57) ABSTRACT

A method of last known position reporting in a device is disclosed. The method generally includes the steps of (A) generating a request signal in an application module of the device, the request signal requesting a current position of the device while a plurality of navigation signals are too weak to calculate the current position, (B) calculating a sequence of known positions in a position module of the device, the known positions being calculated based on the navigation signals with sufficient strength, (C) calculating the current position in the position module in response to the request signal, the current position being calculated based on a last of the known positions and (D) generating a position signal in the position module, the position signal reporting the current position as a valid position to the application module.

20 Claims, 10 Drawing Sheets

LAST KNOWN POSITION REPORTING FOR ALWAYS-ON GLOBAL POSITIONING SYSTEM RECEIVER

CROSS REFERENCE TO RELATED APPLICATIONS

The present application is related to co-pending U.S. patent application Ser. No. 11/613,219, filed Dec. 20, 2006, and Ser. No. 11/613,536 filed Dec. 20, 2006, both of which are hereby incorporated by reference in their entirety.

FIELD OF THE INVENTION

The present invention relates to a method and/or architecture for satellite positioning receivers generally and, more particularly, to a last known position reporting for an always-on Global Positioning System receiver.

BACKGROUND OF THE INVENTION

All existing and previously available embedded Global Positioning System (GPS) receivers are implemented with an implicit assumption that the GPS receiver is generally powered-down, disabled or turned-off for a majority of the time that the equipment in which the GPS receiver is embedded, or operating in conjunction with, is enabled. Therefore, legacy GPS receiver architectures can be viewed as "mostly-off". Under such a usage model, architectures of embedded GPS receivers are significantly influenced by a criterion to rapidly determine a current location when enabled or powered-up. The rapid location determination is commonly known as the "Time To First Fix" or TTFF of the GPS receiver.

A strength of normal GPS signals at the surface of the Earth is typically no less than −129 dBm. However, the normal GPS signal strengths are observed with a direct, unobstructed line-of-sight to each of several GPS satellites. When the strengths of the received signals are lower than −142 dBm, there is no positive signal-to-noise ratio of direct sequence spread spectrum codes in the GPS signals. Therefore, signal acquisition below the −142 dBm power level becomes complex. When a GPS receiver is located in an obstructed region, such as inside a building, within a car or in a coat pocket, the received signal strengths can fall to signal levels of −160 dBm and lower.

At very low signal strengths, phase lock between the GPS receiver and one or more of the GPS satellites is often lost. If the GPS receiver loses phase lock with a particular GPS satellite, the receiver is no longer "tracking" with the particular GPS satellite and thus attempts to "reacquire" phase lock. Conventional GPS receivers can remain phase locked to (i.e., track) GPS signals while the received signal power is below a minimum threshold at which the GPS receiver can acquire phase lock. Once phase lock with the signal is lost, reacquiring phase lock is either (i) significantly expensive in terms of die area of an integrated circuit and/or total power consumed by a solution or (ii) not possible because the signal is too weak for the solution.

Operation of conventional GPS receivers in weak signal conditions, such as within a building, has been a serious problem. Before 2007, acquisition sensitivity exceeding −162 dBm has not been possible. The issue is not if the GPS receiver would work indoors, but rather when would the GPS receiver stop working once moved indoors. In a weak signal environment, GPS signal acquisition is either (i) difficult, (ii) expensive or (iii) impossible. The indoor scenario is a major issue for GPS receivers architected around the assumption that the receiver is generally disabled, powered-down or off. When "mostly-off" receivers are activated in the weak signal environment, the ability to determine location varies with GPS satellite position, signal strength and receiver location. Under such circumstances, the "mostly-off" embedded GPS receivers fail to determine the current location and reports "location unknown".

SUMMARY OF THE INVENTION

The present invention concerns a method of last known position reporting in a device. The method generally comprises the steps of (A) generating a request signal in an application module of the device, the request signal requesting a current position of the device while a plurality of navigation signals are too weak to calculate the current position, (B) calculating a sequence of known positions in a position module of the device, the known positions being calculated based on the navigation signals with sufficient strength, (C) calculating the current position in the position module in response to the request signal, the current position being calculated based on a last of the known positions and (D) generating a position signal in the position module, the position signal reporting the current position as a valid position to the application module.

The objects, features and advantages of the present invention include providing a last known position reporting for an always-on Global Positioning System receiver that may (i) report a last measured location under weak signal conditions, (ii) provide an efficient solution for reporting the position, (iii) provide an accurate solution for reporting the position, (iv) optimize position reporting capabilities and/or (v) be integrated into battery operated equipment.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

An advanced Global Positioning System (GPS) receiver architecture in accordance with the present invention is "always-on" and thus always aware of the current location.

An always-on GPS receiver is generally capable of reporting last measured locations in weak signal environments, as an alternative to the legacy solutions that report the current location as unknown. Under many circumstances appropriate for consumer equipment, reporting the last known position of the GPS receiver is both (i) an efficient solution and (ii) an accurate solution. The always-on GPS receivers may be suitable for integration into battery operated, mobile headsets (often using a Bluetooth communications protocol) used in conjunction with cell phones.

Figure 1:
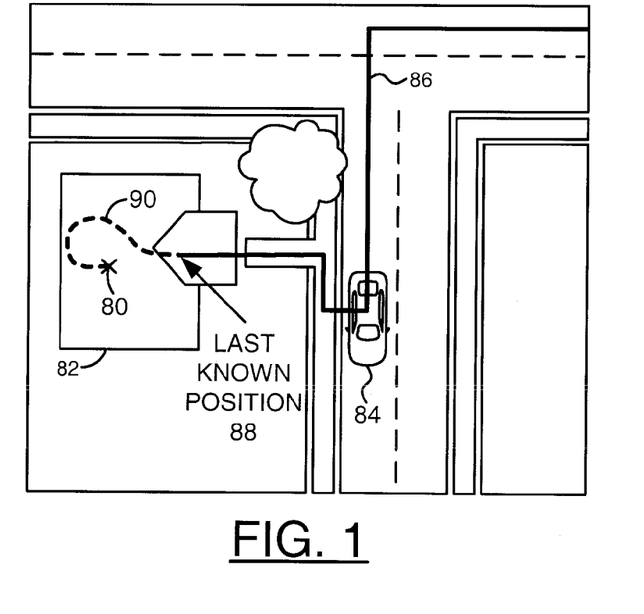
FIG. 1 is a diagram of an example scenario where an always-on GPS receiver reports a last known position.

Referring to FIG. 1, a diagram of an example scenario where an always-on GPS receiver 80 reports a last known position is shown. The receiver 80 may be carried by a user heading for home 82 in a car 84. While the receiver 80 has good reception of the GPS navigation signals (e.g., along the solid line 86), the receiver 80 may measure and report current positions from time to time and/or on demand. As the user carries the receiver 80 into the home 82, the strength of the navigation signal may decrease to a point where a single last known position 88 may be measured. Thereafter, the receiver 80 may report the last known position (e.g., the measured position and/or a nearby extrapolated position) as the user carries the receiver 80 around the home 82 (e.g., along the dotted line 90). Reporting of the last known position may continue until track is reacquired on a sufficient number of navigation signals to update the measured position.

The receiver 80 may be configured to achieve a maximum sensitivity. The maximum sensitivity is generally defined as a point at which the receiver 80 loses the navigation signals from one or more satellites (or other navigation signal sources). For example, all navigation signals may be lost when the receiver 80 enters a building. Since a last known position may be useful to the equipment (or device) in which the receiver 80 in embedded, the maximum sensitivity of the receiver 80 may be set above −160 dBm (e.g, 150 dBm). The relaxed maximum sensitivity generally reduces an average current consumption of the receiver 80 in normal operation.

Figure 2:
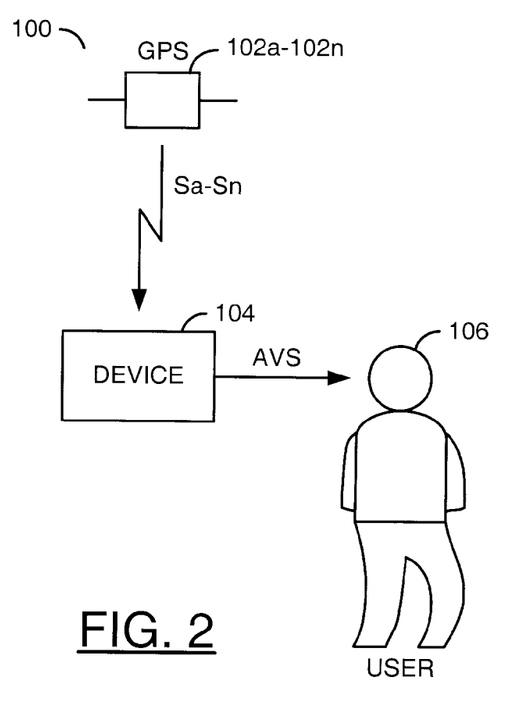
FIG. 2 is a diagram of a system in accordance with a preferred embodiment of the present invention.

Referring to FIG. 2, a diagram of a system 100 is shown in accordance with a preferred embodiment of the present invention. The system 100 generally comprises multiple navigation satellites 102a-102n, a device (or apparatus) 104 and a user 106. The device 104 may include an embedded (or integrated) positioning system receiver.

The device 104 may receive signals (e.g., Sa-Sn) from the navigation satellites 102a-102n. A signal (e.g., AVS) may be generated and presented from the device 104 to the user 106. The signal AVS generally comprises one or more audio signals, one or more visual signals and/or one or more tactile signals (e.g., vibrations) perceivable by the user 106.

In some embodiments, the navigation satellites 102a-102n may be part of the Global Positioning System (GPS) constellation. In other embodiments, the satellites 102a-102n may be part of the GLObal NAvigation Satellite System (GLONASS). Other space-based positioning systems, such as the proposed Galileo project, may be used as the source of the signals Sa-Sn.

The device 104 may be implemented as a handheld (or portable) electronic device with an embedded navigation receiver. The device 104 may be operational to provide location-based applications and/or services to the user 106 based on location. The device 104 may be implemented as a variety of items, such as a cell phone, a personal digital assistant (PDA), a laptop computer, a GPS receiver, a heads-up display, a digital camera with built-in GPS and/or other battery powered equipment.

Figure 3:
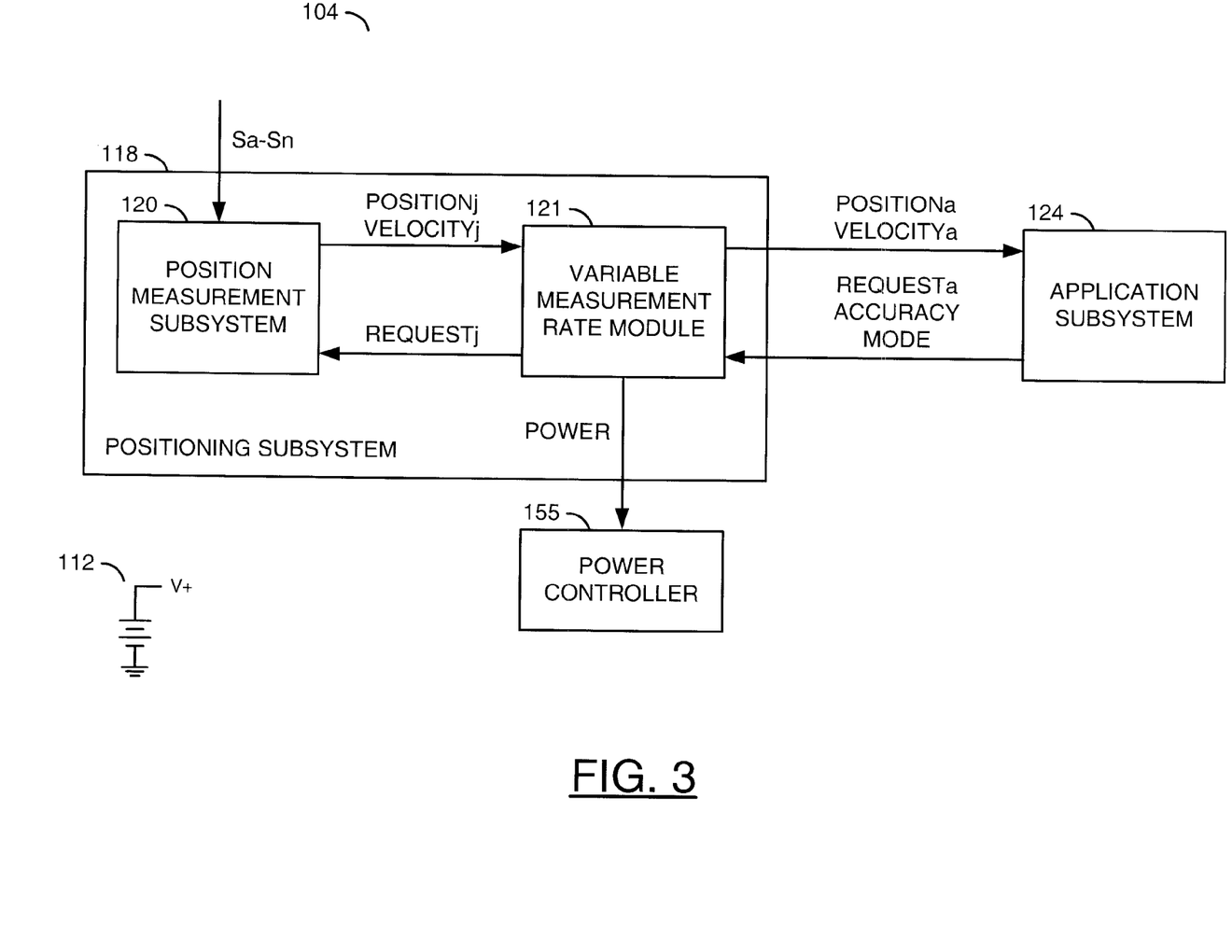
FIG. 3 is a block diagram of an example implementation of a position-aware device of the system.

Referring to FIG. 3, a block diagram of an example implementation of the device 104 is shown. The device 104 generally comprises one or more batteries 112, a module (or subsystem) 118, a module (or subsystem) 124 and a module (or circuit) 155. The signals Sa-Sn may be received by the subsystem 118. A signal (e.g., POSITIONa) may be generated and presented from the subsystem 118 to the subsystem 124. A signal (e.g., VELOCITYa) may also be generated and presented from the subsystem 118 to the subsystem 124. The subsystem 124 may generate and present a signal (e.g., REQUESTa) to the subsystem 118. A signal (e.g., ACCURACY) may be generated by the subsystem 124 and presented to the subsystem 118. A signal (e.g., MODE) may also be generated by the subsystem 124 and presented to the subsystem 118. The module 155 may receive a signal (e.g., POWER) generated by the subsystem 118.

The subsystem 118 may be implemented as a positioning subsystem (or position module). The subsystem 118 is generally operational to measure a position and a velocity of the device 104. The position and/or the velocity of the device 104 may be calculated, for example, by receiving and processing the signals Sa-Sn transmitted from the navigation satellites 102a-102n. Other navigation signals may be used to meet the criteria of a particular application.

The position and the velocity may be reported periodically, aperiodically and/or on demand in the signal POSITIONa and the signal VELOCITYa. The rate of reporting generally depends on a current position, a current velocity, an acceleration of the device 104 and/or a reporting criteria of a user application (e.g., a location based service). The rate of reporting may also depend on accuracy criteria received in the signal ACCURACY, an operational mode received via the signal MODE and/or a demand in the signal REQUESTa.

The subsystem 124 may be implemented as an application subsystem (or application module). The subsystem 124 generally comprises one or more application processors, dedicated hardware modules, software modules, combinations of hardware and software and/or other computing systems that may execute one or more application programs and/or tasks. The subsystem 124 may exist (i) within the device 104 (for example, running on an application processor in a cellular handset type of device 104), (ii) separately from the device 104 (for example, within a cellular telephone network) or (iii) the subsystem 124 may span the device 104 and other external equipment.

The module 155 may be implemented as a power control module. The module 155 is generally operational to control power to the hardware and/or execution of software for the subsystem 118 and the subsystem 124 based on data received in the signal POWER. Power control may include, but is not limited to, application/removal of electrical power, timing of software execution and/or increasing/decreasing clock speeds. The module 155 generally allows the device 104 to conserve the batteries 112 by (i) reducing electrical power consumption while location-based tasks and/or location-based services are not in use and (ii) minimizing the power consumption when the location-based tasks and/or location-based services are in use.

The subsystem 118 generally comprises a module (or subsystem) 120 and a module (or circuit) 121. The subsystem 120 generally receives the signals Sa-Sn. The module 121 may generate the signal POSITIONa and the signal VELOCITYa. The signal REQUESTa, the signal ACCURACY, the signal MODE and the signal MOTION may be received by the module 121. A signal (e.g., POSITIONj) may be generated and presented from the subsystem 120 to the module 121. A signal (e.g., VELOCITYj) may also be generated by the subsystem 120 and presented to the module 121. The module 121 may generate and present a signal (e.g., REQUESTj) to the subsystem 120.

The subsystem 120 may be implemented as a position measuring subsystem. The subsystem 120 may be operational to calculate a current location of the device 104 continuously based on the signals Sa-Sn. A velocity of the device 104, a trajectory (or direction) of the device 104 and a current time may also be calculated by the subsystem 120. Other navigation type signals may be used as input to the calculations. Details of an example subsystem 120 may be found in the co-pending U.S. patent application Ser. No. 11/613,219.

The module 121 may be implemented as a variable measurement rate module. The module 121 may be operational to report coordinates representing the location of the device 104, and thus the user 106, to the subsystem 124. The reported coordinates generally give the subsystem 124 the impression that the position measurement subsystem 118 is always-on. The reporting may be periodic, aperiodic and/or on demand based on the data received in the signal REQUESTa, the signal MODE and/or the signal ACCURACY. In addition to the logical arrangement shown in FIG. 3, the module 121 may be implemented as a part of the subsystem 118, as part of the subsystem 124 or as a separate subsystem standing alone. A partitioning decision may be made according to whichever arrangement yields the lowest overall system power consumption. Additional information regarding the modes of the device 104 may be found in the co-pending U.S. patent application Ser. No. 11/613,536.

Figure 4:
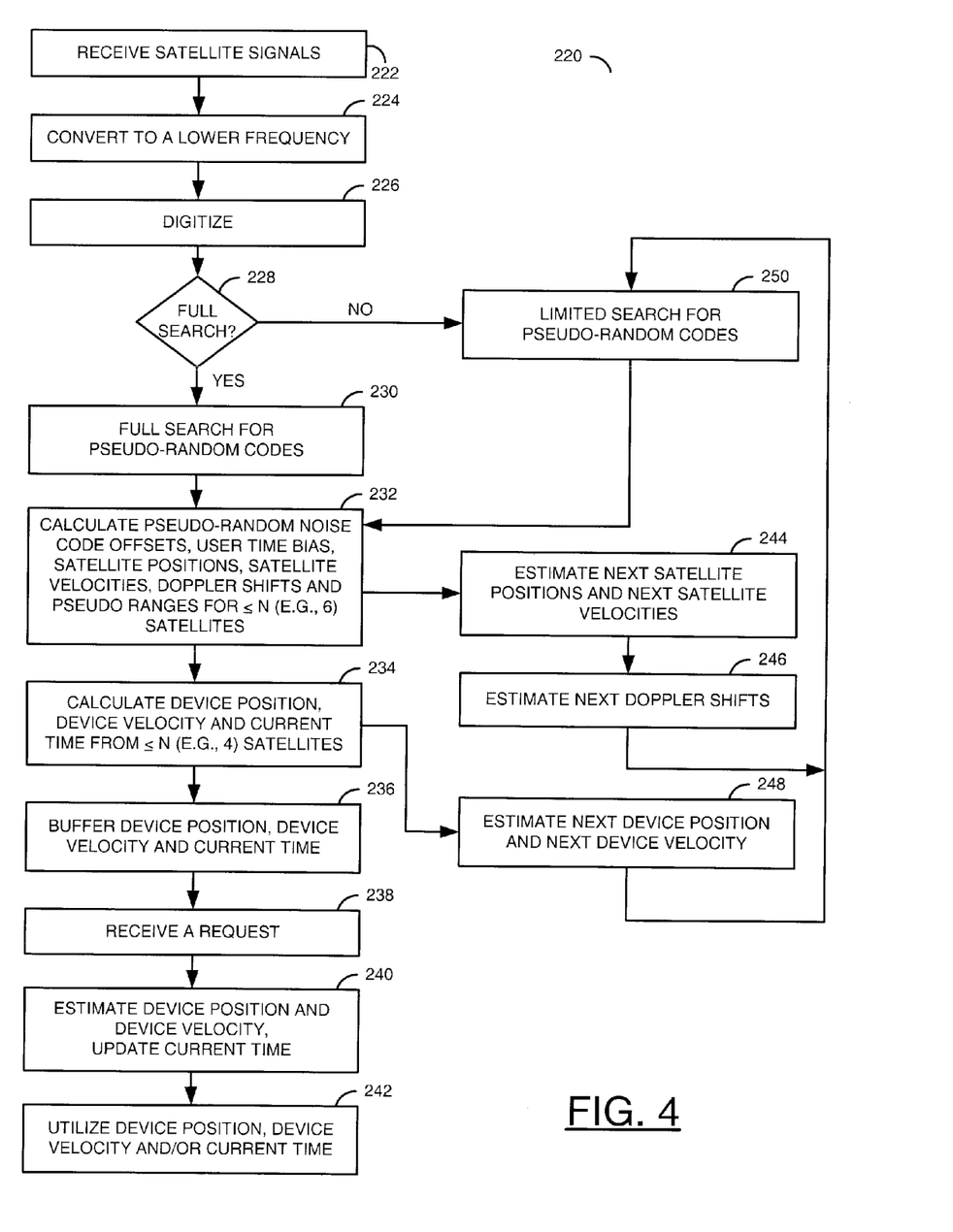
FIG. 4 is a flow diagram of an example positioning method performed by the device.

Referring to FIG. 4, a flow diagram of an example positioning method 220 performed by the device 104 is shown. The method (or process) 220 may be implemented as a satellite positioning operation. The method 220 generally comprises a step (or block) 222, a step (or block) 224, a step (or block) 226, a step (or block) 228, a step (or block) 230, a step (or block) 232, a step (or block) 234, a step (or block) 236, a step (or block) 238, a step (or block) 240, a step (or block) 242, a step (or block) 244, a step (or block) 246, a step (or block) 248 and a step (or block) 250.

In the step 222, the subsystem 120 may receive one or more of the signals Sa-Sn. The received signals Sa-Sn may be frequency converted to an intermediate frequency or a baseband frequency in the step 224. The resulting signal may then be digitized in the step 226.

If the digitized data contains an initial set of data from the satellites 102a-102n, a full search for the pseudo-random codes may be performed by the subsystem 120 (e.g., the YES branch of the step 228). In the step 230, the subsystem 120 may search in both frequency and in time for the pseudo-random codes. The search may be limited to the strongest signals. Satellites known to be well below the horizon may be eliminated from the search.

Once the pseudo-random codes have been identified, a correlation peak from a prompting correlator may be examined to estimate the signal energy. If a sub-chip time offset exists in the locally generated pseudo-random noise code, a local reference frequency error (e.g., due to a Doppler shift) may be corrected. The subsystem 120 may then calculate the satellite positions, the satellite velocities and the Doppler shift information in the step 232. To conserve power, the calculations may be (i) limited to a restricted number of satellites (e.g., at most six satellites), (ii) performed periodically (e.g., once every 15 second to 30 seconds), (iii) performed aperiodically and/or (iv) performed on demand.

In the step 234, the subsystem 120 may calculate the position of the device, the velocity of the device 104 and a "GPS time" (e.g., 14 seconds different from Universal Time as of Jan. 1, 2006). The user time bias from the GPS time may be calculated by the subsystem 120. The calculations are generally based on the pseudo-ranges and the Doppler shift information. Once calculated, the device position, the device velocity and the current time may be buffered by the subsystem 120 in the step 236.

To save power, the calculations may be limited to a restricted number of satellites. Generally, the subsystem 120 may calculate a Geometric Dilution Of Precision (GDOP), a Dilution Of Precision (DOP) or other applicable metric, for all of the satellites 102a-102n that may be visible. A combination of the satellites 102a-102n (e.g., at most four) that gives a best dilution of precision metric may be used by the subsystem 120. In contrast, a typical position-velocity calculation takes into account 4 to 12 of the satellites 102a-102n.

The subsystem 124 may send a request to the module 121 for one or more of (i) the device position, (ii) the device velocity and (iii) the current time via the signal REQUEST in the step 238. The module 121 may respond to the request by estimating the device position and/or the device velocity at the time of the request based on prior device positions and/or prior device velocities in the step 240. The module 121 may also update the current time in the step 240 for presentation to the subsystem 124. In the step 242, the subsystem 124 may utilize the requested information to provide location/time-based services and/or applications to the user.

During subsequent sets of searches and calculations performed on the satellite signals Sa-Sn, the subsystem 120 may use prior knowledge of the satellite positions, the satellite velocities, the device position, the device velocity and the current time to simplify the workload. In the step 244, the subsystem 120 may estimate the next satellite positions and the next satellite velocities. Thereafter, the subsystem 120 may estimate the next expected Doppler shifts of the satellites 102a-102n in the step 246. Likewise, the subsystem 120 may calculate a next device position and a next device velocity in the step 248. A combination of the estimated satellite positions, satellite velocities, Doppler shifts, device position and device velocity may be used in the subsystem 120 to perform a limited search of the next set of pseudo-random codes in the step 250. Once the pseudo-random codes have been found, the subsystem 120 may continue calculating the actual satellite positions, the actual satellite velocities and the actual Doppler shift information as before in the step 236.

As the GPS signal strengths vary between strong and weak signal conditions, periods of time generally exist when the subsystem 118 is unable to update an estimate of the current location. If the device 104 has not physically moved and if the GPS signal strengths have faded, perhaps due to variations in the atmosphere, obstructions in line of sight to the satellites 102a-102n, the weak signal condition may be transient. Under transient conditions, reporting the last known valid location may be an appropriate and accurate solution for reporting location.

When the device 104 enters a building, the strength of the signals Sa-Sn generally declines. Often the reduction in signal strength is 20 dB or more. The signal strength reduction may shift the subsystem 118 from a state of being phase locked to several GPS satellite broadcasts to a state of being phase locked to none of the satellite transmissions from any of the satellites 102a-102n.

Figure 5:
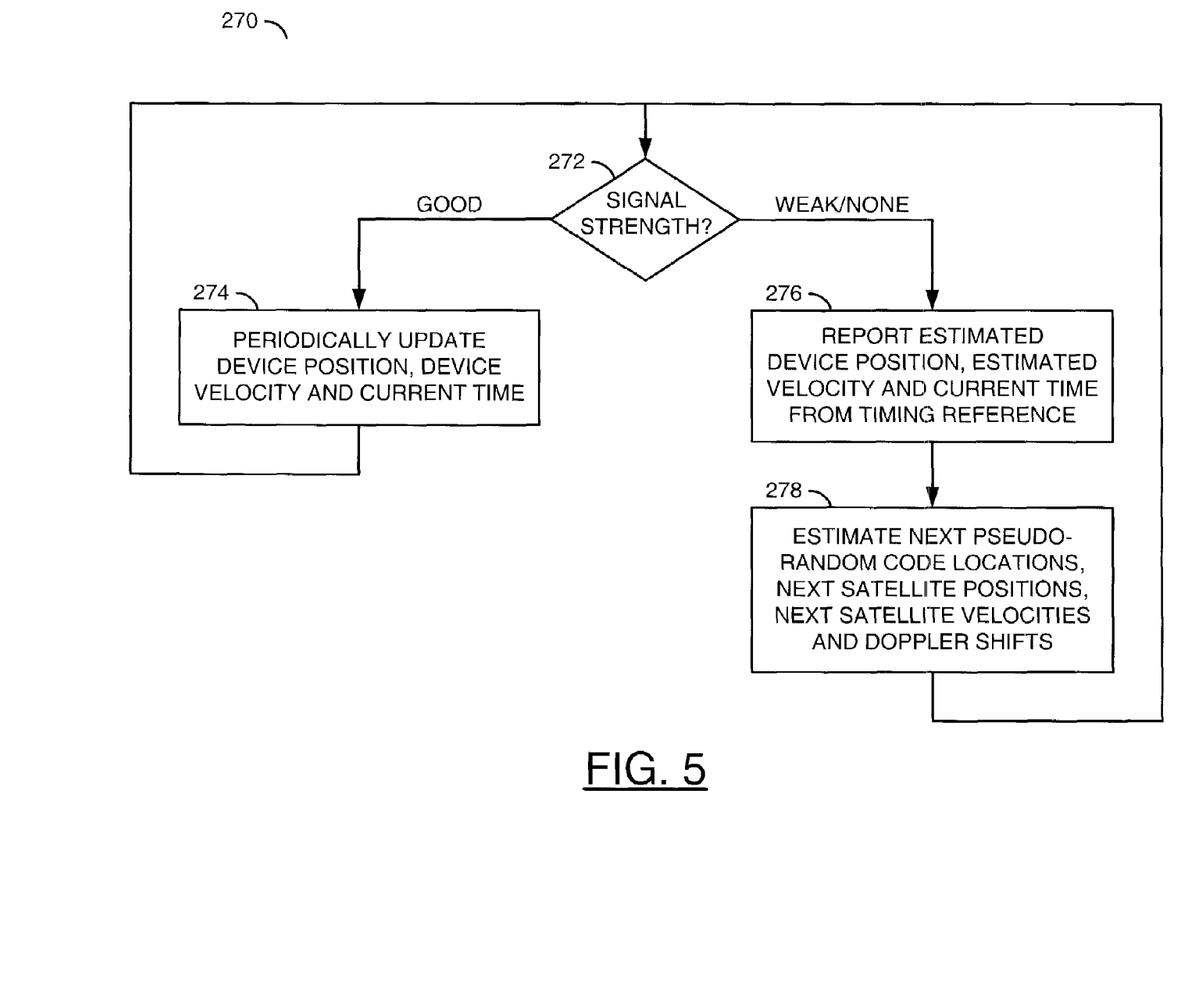
FIG. 5 is a flow diagram of an example method for coping with weak signal and no signal conditions.

Referring to FIG. 5, a flow diagram of an example method 270 for coping with weak signal and no signal conditions is shown. The method (or process) 270 may implement a signal dropout method. The method 270 generally comprises a step (or block) 272, a step (or block) 274, a step (or block) 276 and a step (or block) 278.

In the step 272, a strength of the satellite signals Sa-Sn is checked. If the signal strength is good (e.g., the GOOD branch of step 272), the method may continue with the step 274. In the step 274, the device 104 may periodically update the device position, the device velocity and the current time, as described in detail above.

If the signal strength is weak, insufficient satellite signals are being received and/or no satellite signals are being received (e.g., the WEAK/NONE branch of step 272), the method may continue with the step 276. In the step 276, an estimated position may be reported whenever the module 121 is interrogated by the application subsystem 124. The estimated position may be a last known device position and/or an extrapolated device position. An estimated device velocity may be reported as zero, unknown or the last known velocity. A current time determined by the subsystem 118 may also be reported. While signal conditions remain weak (e.g., the user is still indoors), the method 270 generally achieves a position accuracy that is better than a few tens of meters. Such an accuracy may be at least as accurate as other indoor positioning methods.

In the step 278, subsystem 118 generally maintains an accurate timing fix so that the subsystem 120 may continuously estimate the next pseudo-random code locations, the next satellite positions, the next satellite velocities and the next Doppler shifts based on an elapsed time since the last position fix. When more favorable signal conditions return (e.g., the GOOD branch of step 272), the estimations may enable the device 104 to rapidly update the device position, the device velocity and/or the current time.

Figure 6:
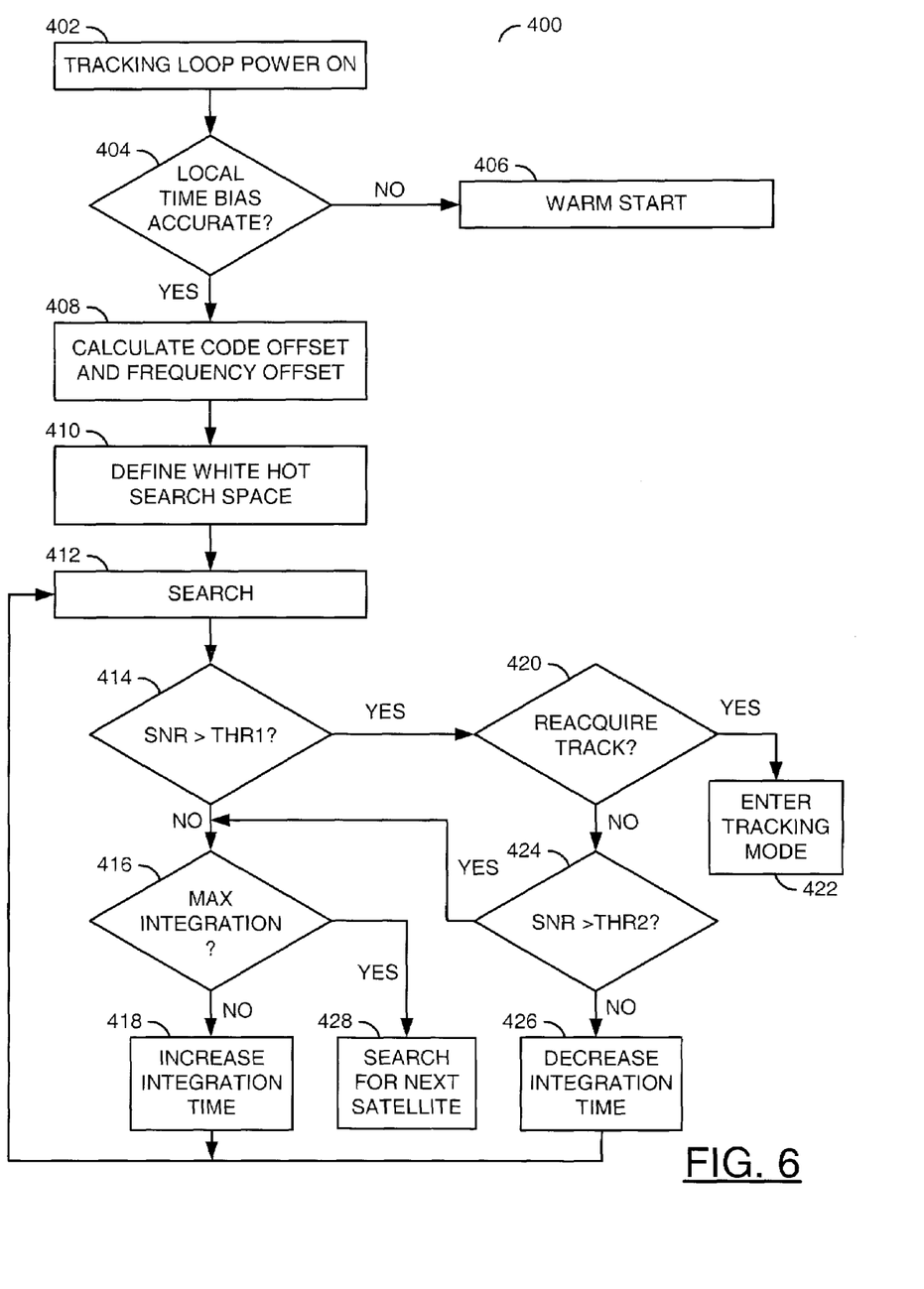
FIG. 6 is a flow diagram of an example method of adaptive sensitivity.

Referring to FIG. 6, a flow diagram of an example method 400 of adaptive sensitivity is shown. The method (or process) 400 may be implemented in the subsystem 120. The method 400 generally comprises a step (or block) 402, a step (or block) 404, a step (or block) 406, a step (or block) 408, a step (or block) 410, a step (or block) 412, a step (or block) 414, a step (or block) 416, a step (or block) 418, a step (or block) 420, a step (or block) 422, a step (or block) 424, a step (or block) 426 and a step (or block) 428.

By varying the coherent integration time and the non-coherent integration time, the sensitivity of the subsystem 118 may be varied. In a typical implementation of a tracking loop, the loop is frequency and code locked to signals transmitted from the satellites 102a-102n. Commonly, the radio and tracking loops are continuously powered in order to maintain a lock. However, when the signal strength received from the satellites drops (for example, in a fade or when the receiver is moved indoors), the frequency lock and/or the code lock may be lost. As such, the receiver must make a reacquisition if the satellite signals fade faster than the tracking loop can adjust the sensitivity. Many implementations of commercial tracking loops have a limited number of coherent/non-coherent integration times, and consequently have discrete levels of sensitivity with no capability to adaptively adjust the sensitivity of the tracking loop beyond the limited discrete levels. In the case of the present invention, the frequency lock and the code lock are not designed to continuously track the location of the device 104. Instead, power is duty-cycled and the device 104 may make repeated white-hot starts.

In a white-hot start, the tracking loop architecture is generally scaled to search a defined subset of the code and frequency space in parallel to allow rapid and power efficient tracking reacquisition when duty-cycling power in the GPS receiver. The search space may be defined as a minimum space to achieve immediate reacquisition under most, but not all, circumstances following a predefined maximum power-down period.

In the step 402, the device 104 may power on the tracking loop. A check of the local time bias may be made in the step 404 to determine if the potential errors in the local time bias are sufficiently small to perform the white-hot start. If the accuracy is not present (e.g., the NO branch of step 404), the device 104 may perform a warm start in the step 406.

In a warm start situation, the device 104 has been powered down for a time shorter than the ephemris update time. The following parameters may be unknown in the warm start, the crystal temperature and aging errors, the chip positions, the visible satellites identifications, the Doppler frequency errors and the data bit boundaries for each of the satellites. Since the ephemris data may still be valid, approximately 30 seconds may be removed from the time to first fix calculation. As part of the power on sequence, local real time clock data may to be evaluated so that the validity of the ephemris data may be determined. Even if the device 104 has been powered down for a time longer than the ephemris update time, the present solution may still work with an increased position inaccuracy.

If the local time bias is accurate (e.g., the YES branch of step 404), the circuit 108 may calculate the code offsets and the frequency offsets in the step 408. From the offsets, the circuit 108 may define the space 334 in the step 410. In the step 412, a white-hot search may be performed.

At each white-hot start, the signal strength may be evaluated by considering the signal-to-noise ratio reported from the prompt correlation finger. If the signal-to-noise ratio is below a first predefined threshold (e.g., the NO branch of step 414) the white-hot start has failed to find the correlation peak. A check of the integration time in use may be made in the step 416. If the current integration time is less than a maximum integration time (e.g., the YES branch of step 416), the coherent and/or non-coherent integration times may be increased in the step 418 to increase sensitivity. The white-hot start may then be tried again with the increased sensitivity.

On the other hand, if the signal-to-noise ratio reported from the prompt correlation finger is higher than the first predefined threshold (e.g., the YES branch of step 414), a check for reacquisition may be performed in the step 420. If tracking has been successfully reacquired (e.g., the YES branch of step 420), the subsystem 120 may enter the tracking mode in the step 422. If tracking has not been reacquired (e.g., the NO branch of step 420), subsystem 120 may compare the signal-to-noise ratio from the prompt correlation finger with a second predefined threshold in the step 424.

If the signal-to-noise ratio is greater than the second predefined threshold (e.g., the YES branch of step 424), the integration times may be reduced in the step 426 on the next cycle in order to save power. If the signal-to-noise ratio is still less than the second predefined threshold (e.g., the NO branch of step 424), the subsystem 120 may recheck for a maximum integration time in the step 416 and increase the integration times in the step 418, if appropriate. Where the maximum integration times have been reached (e.g., the YES branch of step 416), the search of a current satellite may be ended and a new search of another satellite may be configured in the step 428.

Figure 7:
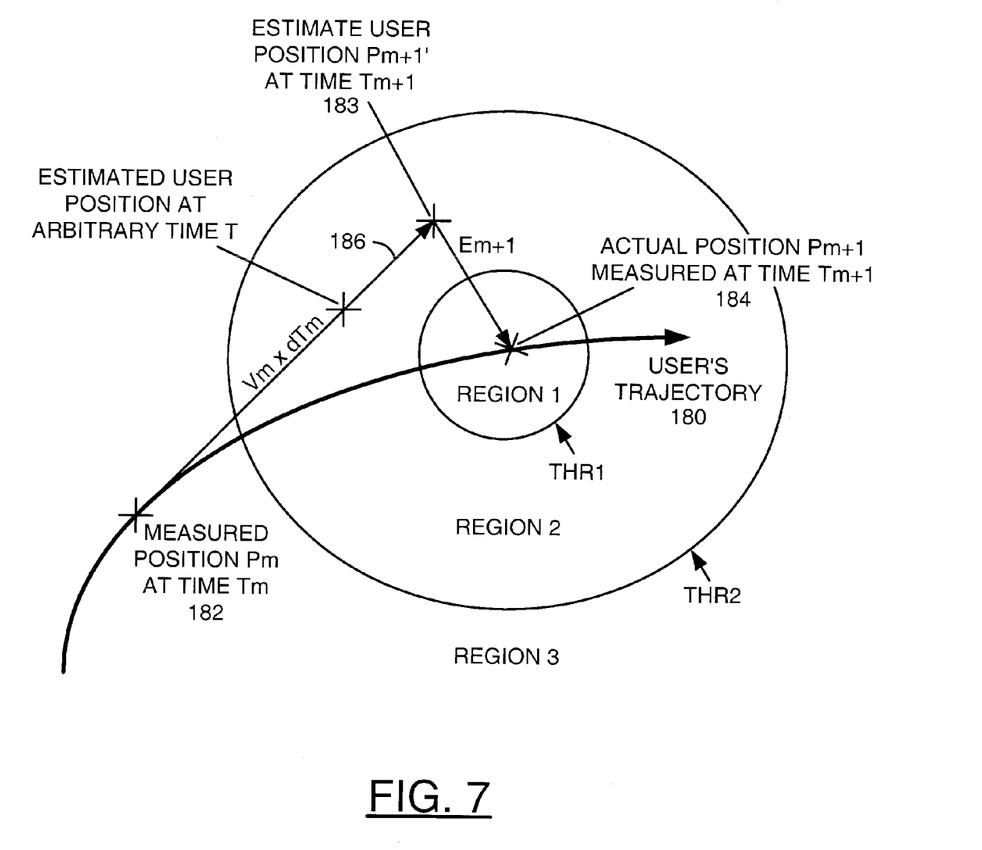
FIG. 7 is a diagram illustrating an example basic operation of a variable measurement rate technique.
Figure 8A:
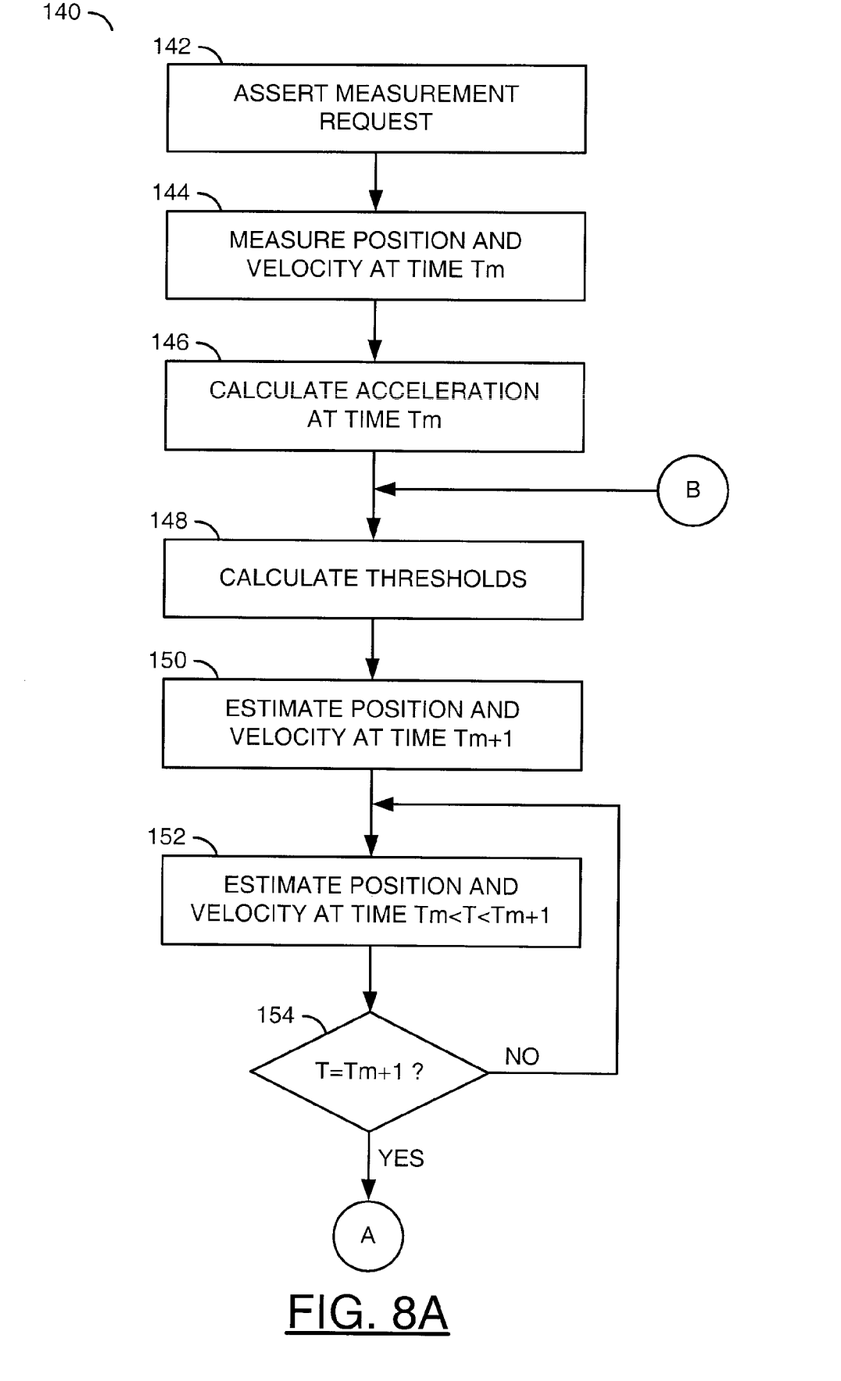
FIGS. 8A-8B are a flow diagram of a method accompanying the basic operation.
Figure 8B:
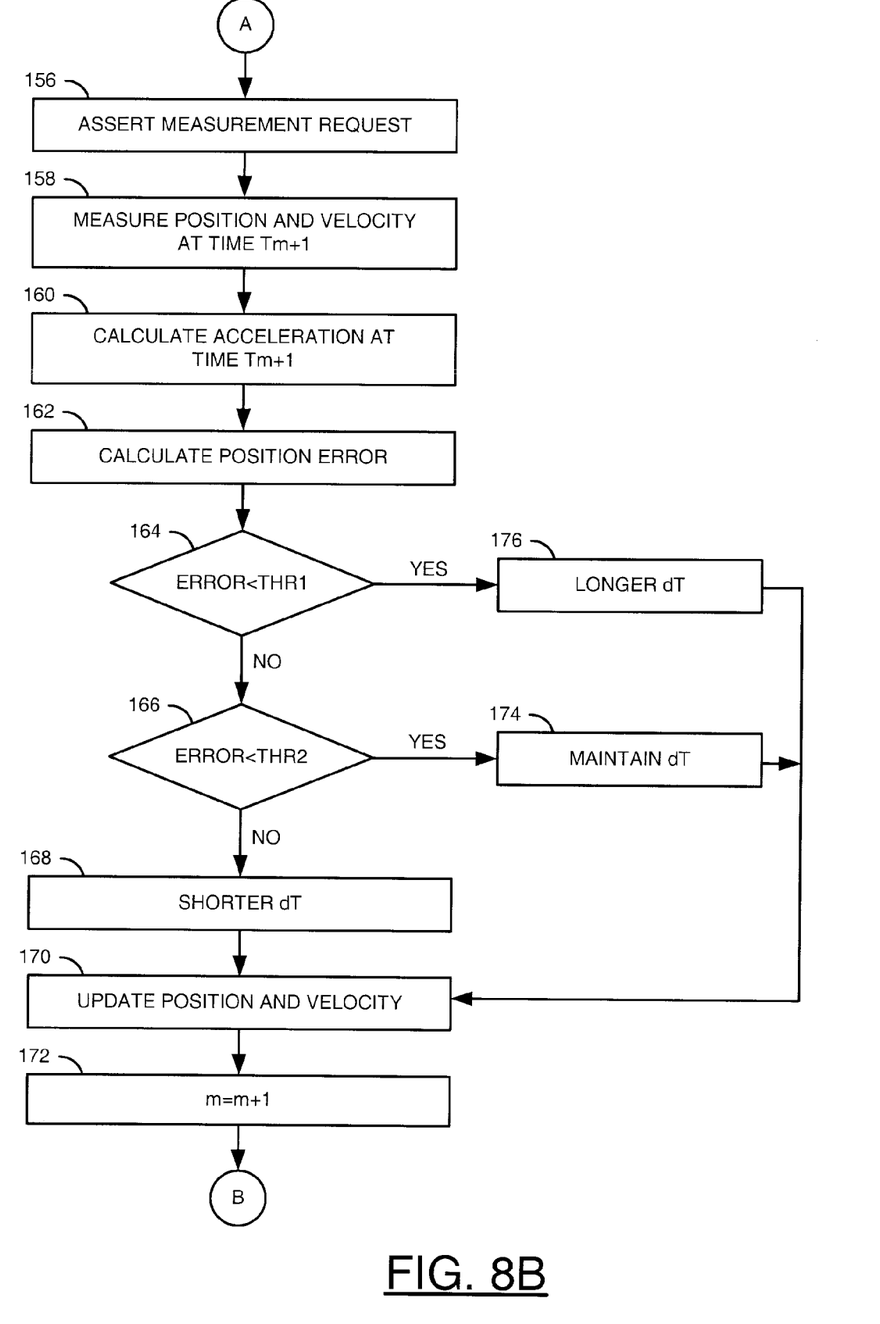

Referring to FIG. 7, a diagram illustrating an example basic operation of the variable measurement rate technique is shown. Referring to FIGS. 8A and 8B, a flow diagram of a method 140 accompanying the basic operation is shown. The method (or process) 140 may implement the variable rate measurement method of the present invention. The method 140 generally comprises a step (or block) 142, a step (or block) 144, a step (or block) 146, a step (or block) 148, a step (or block) 150, a step (or block) 152, a step (or block) 154, a step (or block) 156, a step (or block) 158, a step (or block) 160, a step (or block) 162, a step (or block) 164, a step (or block) 166, a step (or block) 168, a step (or block) 170, a step (or block) 172, a step (or block) 174 and a step (or block) 176.

In the example, the device 104 may be traveling along a path 180. In the step 142, the module 121 may assert the signal REQUESTj at a first time (e.g., Tm) commanding the subsystem 120 to measure a current position (e.g., Pm) and a current velocity (e.g., Vm) of the device 104. The subsystem 120 may respond to the command by measuring the position Pm and the velocity Vm at a point (e.g., 182) along the path 180 in the step 144. The position Pm may be returned in the signal POSITIONj and the velocity Vm may be returned in the signal VELOCITYj to the module 121. In the optional step 146, the module 121 may calculate an acceleration (e.g., Am) of the device 104 at the time Tm. In some embodiments, the module 121 may also calculate one or more thresholds in the step 148 (e.g., THR1 and THR2) for use at a later second time (e.g., Tm+1). The thresholds THR1 and THR2 may be functions of the velocity Vm, the acceleration Am (if known), a condition (e.g., Cm) of the signals Sa-Sn, an accuracy (or quality) value (e.g., Qm) received via the signal ACCURACY and/or time. In some embodiments, the thresholds THR1 and THR2 may be predetermined fixed values.

In the step 150, the module 121 may generate an extrapolated position (e.g., Pm+1' at the point 183) and an extrapolated velocity (e.g., Vm+1') at the time Tm+1. The time Tm+1 may be determined as a sum of the current time Tm and a time step or interval (e.g., dTm) associated with the time Tm (e.g., Tm+1=Tm+dTm). The time interval (or delta time) dTm may have been calculated at an earlier time (e.g., Tm−1) and may start from the time Tm. An inverse of the interval dTm (e.g., $(dTm)^{-1}$) may indicate a measurement rate defined at the time Tm.

The position Pm+1' may be calculated by a linear extrapolation technique based on the position Pm and the velocity Vm (e.g., Pm+1'=Pm+(Vm×dTm)). In some embodiments, one or more sophisticated extrapolation techniques may also be used. For example, calculation of the position Pm+1' may consider the acceleration Am at time Tm (e.g., Pm+1'=Pm+(Vm×dTm)+(0.5×Am×dTm$^2$)). In another example, a curve-fitting function may be used to the predict the future trajectory from historical measurements. The calculations may also use one or more previously measured positions (e.g., Pm−1, Pm−2, . . . , Pm−g), one or more previously measured velocities (e.g., Vm−1, Vm−2, . . . , Vm−g) and/of one or more previously determined accelerations (e.g., Am−1, Am−2, . . . , Am−g) to increase an accuracy of the extrapolation.

The device 104 generally travels along the path 180 starting from the point 182 at the time Tm and reading a second point (e.g., 184) at the time Tm+1. Between the time Tm and the time Tm+1, the subsystem 120 may be powered off or placed in a low power mode to conserve power. Therefore, the module 121 may calculate an estimated (projected) position and an estimated (projected) velocity of the device 104 along a projected path 186 between the position Pm and the position Pm+1' in the step 152. The interpolated position and the interpolated velocity may be calculated periodically and/or on demand through the signal REQUESTa. The interpolation method may be similar to the extrapolation method used to calculate Pm+1'. As long as the current time (e.g., T) is earlier than the time Tm+1 (e.g., the NO branch of step 154, the module 121 may continue to generate and report the estimates as appropriate.

When the time T reaches the time Tm+1 (e.g., the YES branch of step 152), the module 121 may reassert the signal REQUESTj to the subsystem 120 in the step 156. At the time Tm+1, the subsystem 120 may once again measure the actual position (e.g., Pm+1) and the actual velocity (e.g., Vm+1) of the device 104 in the step 158. A new acceleration (e.g., Am+1) may optionally be calculated by the module 121 in the step 162.

The module 121 may calculate an error (or difference) value (e.g., Em+1) at the time Tm+1 in the step 162. The calculation may compare the position Pm+1' with the position Pm+1 to determine the value Em+1. The value Em+1 is generally a spatial difference between the position Pm+1' and the position Pm+1 (e.g., Em+1=Pm+1'−Pm+1).

The module 121 may then compare the value Em+1 against the threshold THR1 and the threshold THR2 in the steps 164 and 166. If the value Em+1 is greater than the threshold THR1 (e.g., the NO branch of step 164) and greater than the threshold THR2 (e.g., the NO branch of step 166), the position Pm+1' may be considered too inaccurate (e.g., in a REGION 3). The REGION 3 may be the space greater than the threshold THR2 distance from the position Pm+1. As such, the module 121 may shorten a next interval (e.g., dTm+1) in the step 168 in order to bring a subsequent extrapolated position (e.g., Pm+2') closer to a subsequent measured position (e.g., Pm+2).

In the step 170, the module 121 may update the reported position in the signal POSITIONa to the position Pm+1 and the reported velocity in the signal VELOCITYa to the velocity Vm+1. A next cycle (e.g., m=m+1) may be started by the subsystem 118 in the step 172. At the time Tm+1, the method 140 may continue calculating new thresholds THR1 and THR2 at the step 146.

Returning to step 166, if the value Em+1 is greater than the threshold THR1 and less than the threshold THR2 at the time Tm+1 (e.g., the YES branch of step 166), the extrapolated position Pm+1' may be considered to have an acceptable accuracy (e.g., in a REGION 2). The REGION 2 may be a space less than the threshold THR2 distance and greater than the threshold THR1 distance from the position Pm+1. As such, the module 121 may maintain the next time interval dTm+1 the same as the current interval dTm in the step 174. The method 140 may continue with updating the position and the velocity in the step 170.

If the value Em+1 is less than the threshold THR1 (e.g., the YES branch of step 164), the position Pm+1 may be considered too accurate (e.g., in a REGION 1). The REGION 1 may be a space less than the threshold THR1 distance from the position Pm+1. Therefore, the module 121 may make the next time interval dTm+1 longer than the interval dTm in the step 176. The longer interval dTm+1 may be used to decrease the power consumption rate of the device 104 by making fewer measurements over longer periods while still maintaining an acceptable accuracy (e.g., allow a return to REGION 2). The method 140 may continue with updating the position and the velocity in the step 170.

The calculations for the predicted position Pm+1' and the measurements of the current position Pm may be performed independently from each other. For example, one or more intermediate position/velocity measurements may be made between the time Tm and the time Tm+1 with or without updating the extrapolated position Pm+1'. In another example, the extrapolated position Pm+1' may be calculated and/or updated from an estimated position generated after the time Tm. The independence generally enables the error Em+1 to be estimated before the time Tm+1 is reached. Furthermore, a satellite-related portion of the subsystem 118 may be designed more independently from a position/velocity/time-related portion. As such, the module 121 may continue to extrapolate the current position and velocity after the subsystem 120 has lost track of the satellites 102a-102n.

The module 121 and/or subsystem 120 may be configured to accommodate several application modules operating substantially simultaneously within the subsystem 124. The module 121 may utilize multiple instances and/or time-sharing to process different accuracy criteria from the various applications resulting in different thresholds and different measurement rates. The subsystem 120 may have a core measurement (GPS) engine for making the actual measurements and several position/velocity/time estimation engines (e.g., several instances and/or time-shared) to handle the various application modules.

Figure 9:
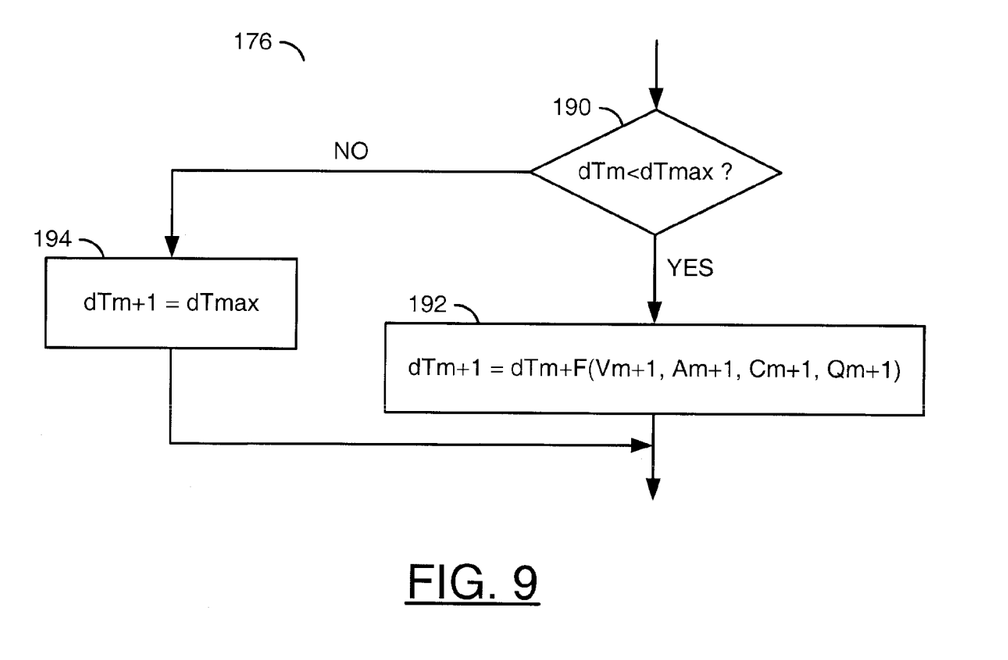
FIG. 9 is a flow diagram of an example implementation of the interval lengthening step.

Referring to FIG. 9, a flow diagram of an example implementation of the interval lengthening step 176 is shown. The step 176 generally comprises a step (or block) 190, a step (or block) 192 and a step (or block) 194.

In the step 190, the interval value dTm may be compared with a maximum value (e.g., dTmax) by the module 121. If the value dTm is less than the value dTmax (e.g., the YES branch of step 190), the module 121 may increase the interval dTm by a function of the velocity Vm+1, the acceleration Am+1, the signal condition Cm+1 and/or the accuracy Qm+1 in the step 192. If the value dTm in not less than the value dTmax (e.g., the NO branch of step 190), the module 121 may set the value dTm+1 to the maximum value dTmax in the step 194.

Figure 10:
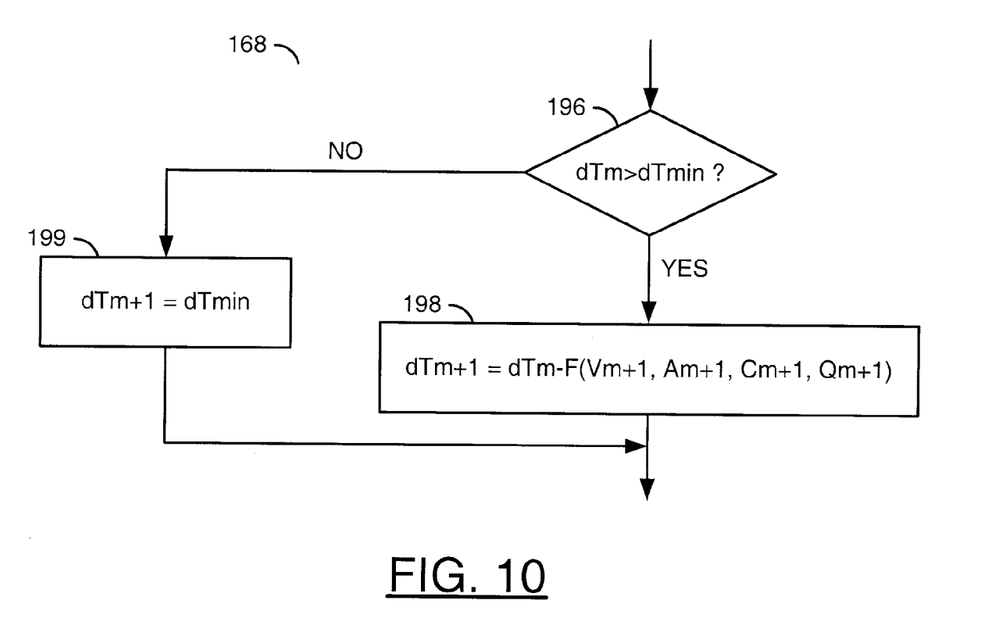
FIG. 10 is a flow diagram of an example implementation of the interval shortening step.

Referring to FIG. 10, a flow diagram of an example implementation of the interval shortening step 174 is shown. The step 174 generally comprises a step (or block) 196, a step (or block) 198 and a step (or block) 199.

In the step 196, the interval value dTm may be compared with a minimum value (e.g., dTmin) by the module 121. If the value dTm is greater than the value dTmin (e.g., the YES branch of step 196), the module 121 may decrease the interval dTm by a function of the velocity Vm+1, the acceleration Am+1, the signal condition Cm+1 and/or the accuracy Qm+1 in the step 198. If the value dTm in not greater than the value dTmin (e.g., the NO branch of step 196, the module 121 may set the minimum value dTm+1 to the value dTmin in the step 199.

The average rate at which the position measurements are made may be (approximately) proportional to the total power consumption in the subsystem 120. Therefore, the interval dTm to the next position measurement may be maximized and/or the measurement rate $(dTm)^{-1}$ may be minimized in order to minimize the power consumption. However, the measurement rate should be sufficient to support the criteria of the application subsystem 124 (e.g., the values in the signal ACCURACY). The following factors may be used individually or in combination with one another to determine the measurement rate: (i) the accuracy criterial, (ii) speed, (iii) motion detection, (iv) a maximum anticipated acceleration, (v) a signal condition and possibly other conditions in the subsystem 120 and/or (vi) a learning capability.

The application subsystem 124 may define the accuracy criteria for the positioning subsystem 118 in the signal ACCURACY. The accuracy criteria may be updated at any time. The accuracy generally depends on the nature of the applications/services in operation. If the value Em+1 exceeds the accuracy criteria, the value dTm+1 should be reduced compared with the value dTm. If the value Em+1 is worse than the accuracy criteria, the value dTm+1 might be increased compared with the value dTm. If the value dTm+1 is within the accuracy criteria, the value dTm+1 may carry the value dTm.

The subsystem 120 generally reports the velocity of the device 104 in the signal VELOCITYj. When the device 104 is stationary, the measurement rate may be reduced compared with when the device 104 is moving. Generally, the measurement rate may be steadily reduced over a number of cycles because a probability of moving is expected to reduce the longer the device 104 has been stationary. While stationary, the measurement rate may be reduced down to the minimum value dTmin. The value dTmin may depend on a maximum expected acceleration and a largest acceptable error when the device 104 starts moving again. As the speed of the device 104 increases, the measurement rate is generally increased to maintain tracking accuracy.

An enhancement may be achieved by defining the accuracy Qm+1 as a function of speed. For example, when the speed exceeds 500 kilometers per hour, the user 106 may be considered to be on an aircraft. The nature of any location-based applications and/or location-based services that may be accessed while flying generally demands considerably less accurate position reporting than when walking or driving. Therefore, the measurement rate may be reduced at high speeds.

The value Em+1 is generally governed by a deviation from an expected acceleration between times Tm and Tm+1. At the time Tm, a maximum magnitude of acceleration expected during the interval dTm may be predicted. As such, a predefine maximum value for Em+1 may be determined. Conversely, the interval dTm may be calculated from a maximum allowable value for Em+1 by considering the maximum anticipated acceleration.

The maximum anticipated acceleration may be a function of speed. For example, a maximum acceleration (or deceleration) of 100 kilometers per hour per hour ($kMh^{-2}$) may be defined by the maximum braking or acceleration possible in a car. A maximum accelerate (or deceleration) of 500 $kMh^{-2}$ may be defined by the acceleration/deceleration possible in an aircraft.

Figure 11:
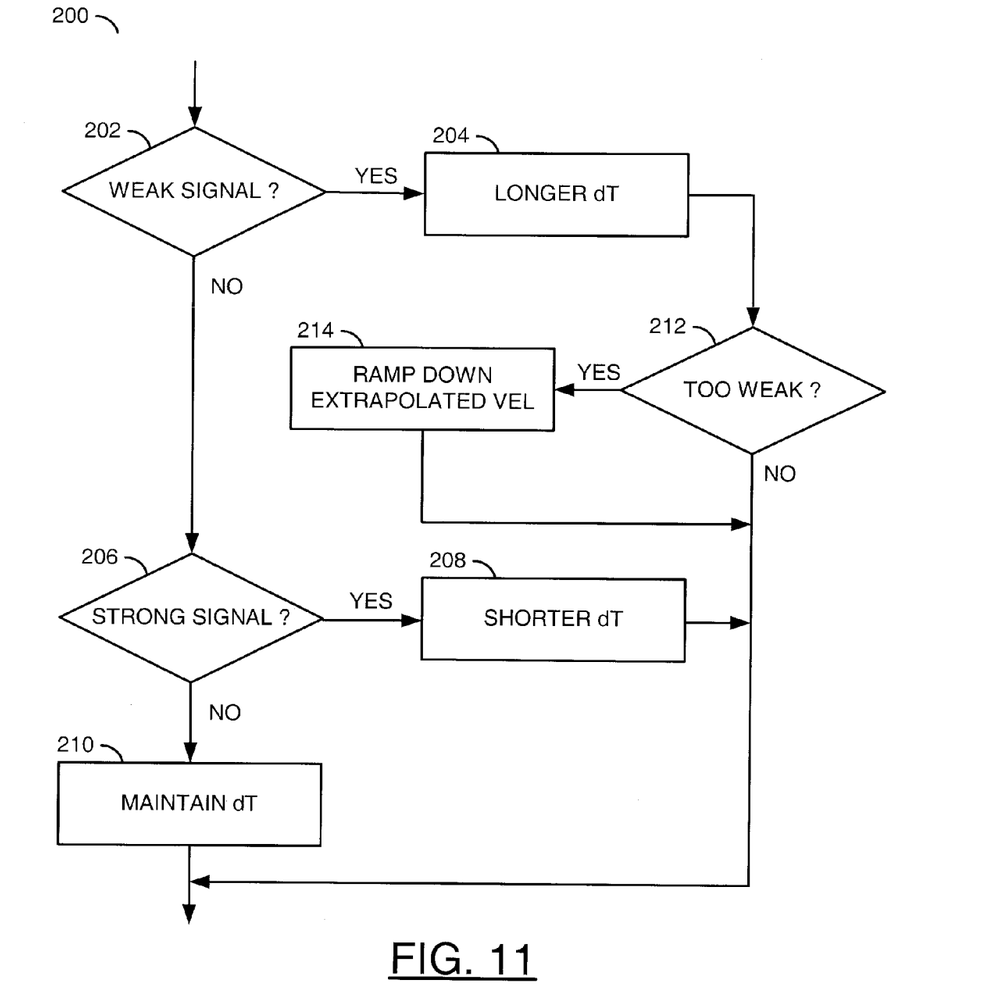
FIG. 11 is a flow diagram of an example method of adjusting a time interval.

Referring to FIG. 11, a flow diagram of an example method 200 of adjusting the interval dTm is shown. The method (or process) 200 may account for the condition of the signals Sa-Sn and/or other conditions at the subsystem 120. The method 200 generally comprises a step (or block) 202, a step (or block) 204, a step (or block) 206 a step (or block) 208, a step (or block) 210, a step (or block) 212 and a step (or block) 214.

The technology used to implement the subsystem 120 generally depends on an ability to receive radio signals transmitted from a known location, such as the signals Sa-Sn transmitted from the navigation satellites 102a-102n. If a very weak signal is received at the antenna (e.g., the YES branch of step 202), additional processing may be appropriate in the subsystem 120 to recover and interpret the signals. The additional processing generally consumes more power and thus the value dTm may be increased in the step 204 by the module 121 to compensate. If the navigation signals have insufficient strength to calculate the device position (e.g., the YES branch of step 212), the extrapolated velocity Vm+1' may be ramped down (decreased) in the step 214. Otherwise, the navigation signals may enable new positions calculations (e.g., the NO branch of step 212). If the signals are strong (e.g., the YES branch of step 206), the module 121 may shorten the interval dTm since fewer calculations may be performed in the subsystem 120. If the signal is moderate (e.g., the NO branch of step 206), the interval dTm may remain unchanged per the step 210.

Receiving weak signals at the antenna may indicate that the device 104 is indoors (assuming that the signal transmitters are not also indoors as is the case, for example, with GPS). When indoors, the expected positioning accuracy of the subsystem 120 may be reduced (e.g., due to multipath effects). Under such conditions, the measurement rate may be reduced by the module 121 in the step 204 without any further degradation in the accuracy achieved.

If the device 104 includes a radio transmitter (e.g., in a cellular telephone), the transmitter may jam the receiver in the subsystem 120 from time to time. When the jamming occurs, the interval dTm should be adjusted to reduce the risk of jamming at the next measurement. For example, the interval dTm may be defined to be different from any time frame definitions used in the transmitting system. If a location update is requested while the cellular telephone is making a telephone call, the subsystem 118 may report the last known position to the subsystem 124 to fulfill the request. Other conditions in the position measurement subsystem 118 may also affect the measurement rate. For example, depending on the implementation of the subsystem 120, increasing the measurement rate to track errors caused by a high rate of change of temperature may be appropriate.

The subsystem 118 may be continuously aware of the strength of the received signals Sa-Sn, the position of the device 104 (and so the user) and a velocity of the device 104. In contrast, a legacy mostly-off GPS receiver determines an instantaneous position and velocity when prompted. The legacy mostly-off GPS receiver is not aware of the immediate location of the receiver prior to entering the building. As such, when the legacy mostly-off GPS receiver next attempts to determine a location under weak/no signal conditions, the position calculation cannot be completed so the mostly-off GPS receiver is unable to report a location within buildings.

When the device 104 is moving slowly (e.g., the user 106 is walking) and there is a rapid change in the received GPS signal strength, the last known position may be flagged as the current receiver location and used for subsequent location reporting to all software and/or hardware applications modules operating in (on) the device 104.

Over extended periods of time the subsystem 118 may "scan" for the signals Sa-Sn of sufficient strength to update the receiver location. Many times the scans may fail due to insufficient signal strength. Sometimes the scans will be successful (e.g., the device 104 has moved slightly closer to a doorway or a window) and an infrequent update of the receiver location is possible. A legacy mostly-off GPS receiver does not "schedule" location update scans and so would be unable to maximize the advantage from infrequent bursts of strong GPS signals in a generally weak GPS signal environment (i.e., the legacy receiver could not utilize the short periods of strong signals if the legacy mostly-off GPS receiver is not enabled or is off).

A rate of scanning for the signals Sa-Sn may be adapted to average signal strengths over time. For example, if the signal strengths fluctuate momentarily from strong to weak and then back to strong, the device 104 may ignore the temporary reduction in signal strengths as the average signal strengths remain modest. However, if the signal strengths become weak for extended periods, the device 104 may reduce the frequency of scanning (e.g., ranging from once every 5 minutes to once every 45 minutes) to conserve power. The scanning may become more infrequent the longer the signals Sa-Sn are weak and/or absent.

When the received GPS signal strength is insufficient for the subsystem 118 to determine the current receiver location, the last known location may be reported. In the context of many buildings and other indoor situations the last known reported position is generally better, in terms of position accuracy and other measures of performance, than alternative location reporting mechanisms, such as cell phone network cell ID.

As the device 104 enters a building, the subsystem 118 may have tracked the device 104 approaching the building. As the device 104 moves deeper into the building, the subsystem 118 is generally able to track the signals Sa-Sn from the currently tracked GPS satellites 102a-102n by increasing the sensitivity/integration times. When the received signal strength from the currently tracked satellites 102a-102n falls below a minimum level that the subsystem 118 is able to or prepared to track, the last know position (e.g., the last actually measured position and/or a final extrapolated position) may be used for all subsequent position reporting.

As the device 104 moves around within the building, the last known position is reported to all location-aware applications operating in (on) the device 104. A surface area occupied by many buildings is generally less than a minimum guaranteed accuracy from alternate positioning technologies. In such circumstances, the last known position of the present invention may offer an improved level of position accuracy compared with the alternative technologies, such as cell ID. As the device 104 emerges from the weak signal environment, the subsystem 118 is generally able to (i) rapidly detect the increase in signal level, (ii) switch immediately back into a full operational mode and (iii) continue an optimized streaming of location information to the other application modules 124 of the device 104. In contrast to legacy mostly-off GPS solutions, the current invention may be able to determine when to schedule GPS position measurements during a period of weak GPS signal strengths. When the GPS signal strengths are weak, the present invention does not attempt rapid position measurements. Instead, the present invention may scan for strong GPS signals, reporting the last known position until a point where sufficiently strong GPS signals are re-detected.

The function performed by the diagrams of FIGS. 1-11 may be implemented using a conventional general purpose digital computer programmed according to the teachings of the present specification, as will be apparent to those skilled in the relevant art(s). Appropriate software coding can readily be prepared by skilled programmers based on the teachings of the present disclosure, as will also be apparent to those skilled in the relevant art(s).

The present invention may also be implemented by the preparation of ASICs, FPGAs, or by interconnecting an appropriate network of conventional component circuits, as is described herein, modifications of which will be readily apparent to those skilled in the art(s).

The present invention thus may also include a computer product which may be a storage medium including instructions which can be used to program a computer to perform a process in accordance with the present invention. The storage medium can include, but is not limited to, any type of disk including floppy disk, optical disk, CD-ROM, magneto-optical disks, ROMs, RAMs, EPROMs, EEPROMs, Flash memory, magnetic or optical cards, or any type of media suitable for storing electronic instructions. As used herein, the term "simultaneously" is meant to describe events that share some common time period but the term is not meant to be limited to events that begin at the same point in time, end at the same point in time, or have the same duration.

While the invention has been particularly shown and described with reference to the preferred embodiments thereof, it will be understood by those skilled in the art that various changes in form and details may be made without departing from the spirit and scope of the invention.

The invention claimed is:

1. A method of last known position reporting in a device, comprising the steps of:
   (A) generating a request signal in an application module of said device, said request signal requesting a current position of said device while all of a plurality of navigation signals received by said device are too weak to calculate said current position;
   (B) calculating a sequence of known positions in a position module of said device, said known positions being calculated based on said navigation signals with sufficient strength;
   (C) calculating said current position in said position module in response to said request signal, said current position being calculated based on a last of said known positions and independent of said navigation signals while said navigation signals are too weak to calculate said known positions; and
   (D) generating a position signal in said position module, said position signal reporting said current position as a valid position to said application module, said device being portable.

2. The method according to claim 1, wherein said current position comprises a last measured position.

3. The method according to claim 1, wherein said current position comprises an extrapolated position away from a last measured position, said extrapolated position being calculated based on both said last measured position and a last known velocity.

4. The method according to claim 3, further comprising the step of:
   reducing said last known velocity in response to said navigation signals becoming too weak to calculate said known positions.

5. The method according to claim 3, wherein said extrapolated position is a function of an accuracy value generated by said application module.

6. The method according to claim 1, further comprising the step of:
   searching repeatedly to reacquire lock on said navigation signals while said navigation signals are too weak to calculate said known positions.

7. The method according to claim 1, further comprising the step of:
   adjusting an interval between successive calculations of said known positions in response to a signal strength of said navigation signals, wherein said interval becomes longer as said signal strength becomes weaker.

8. The method according to claim 1, further comprising the step of:
   adjusting a tracking sensitivity of said navigation signals in response to a signal-to-noise ratio of said navigation signals, wherein said sensitivity is increased while said signal-to-noise ratio is below a first threshold.

9. The method according to claim 8, wherein said sensitivity is decreased while said signal-to-noise ratio is above a second threshold.

10. The method according to claim 1, wherein said known positions are calculated from at most four of said navigation signals.

11. A device comprising:
    an application module configured to generate a request signal requesting a current position of said device while all of a plurality of navigation signals received by said device are too weak to calculate said current position; and
    a position module configured to (i) calculate a sequence of known positions from said navigation signals with sufficient strength, (ii) calculate said current position in response to said request signal, said current position being calculated based on a last of said known positions and independent of said navigation signals while said navigation signals are too weak to calculate said known positions; and (iii) generate a position signal reporting said current position as a valid position to said application module, said device being portable.

12. The device according to claim 11, wherein said position module reports a last measured position as said current position.

13. The device according to claim 11, wherein said position module comprises a rate module configured to calculate said current position as an extrapolated position away from a last measured position, said extrapolated position being calculated based on both said last measured position and a last known velocity.

14. The device according to claim 13, wherein said position module further comprises a measurement module configured to calculate said known positions.

15. The device according to claim 13, further comprising a power module configured to control power consumption in said device in response to a power signal generated by said rate module.

16. The device according to claim 11, wherein said application module is further configured to perform at least one of (i) a location-based application and (ii) a location-based service in response to said position signal.

17. The device according to claim 11, wherein said position module searches infrequently to reacquire lock on said navigation signals while said navigation signals are too weak to calculate said known positions.

18. The device according to claim 11, wherein said navigation signal comprise Global Position System broadcasts.

19. The device according to claim 11, wherein said device comprises at least one of (i) a cell phone, (ii) a laptop computer, (iii) a palm computer, (iv) a personal digital assistant, (v) a heads-up display, (vi) a digital picture camera and (vii) a digital video camera.

20. A device comprising:
    means for generating a request signal requesting a current position of said device while all of a plurality of navigation signals received by said device are too weak to calculate said current position; and
    means for (i) calculating a sequence of known positions from said navigation signals with sufficient strength, (ii) calculating said current position in response to said request signal, said current position being calculated based on a last of said known positions and independent of said navigation signals while said navigation signals are too weak to calculate said known positions and (iii) generating a position signal reporting said current position as a valid position to said means for generating said request signal, said device being portable.

* * * * *